Nov. 20, 1934.  B. P. CRITTENDEN ET AL  1,981,721
DEVICE FOR MEASURING TEMPERATURES OF HOT FLUIDS
Filed Dec. 30, 1926   2 Sheets-Sheet 2

Inventors
Butler P. Crittenden
Alvin C. Killinger

UNITED STATES PATENT OFFICE 1,981,721

DEVICE FOR MEASURING TEMPERATURES OF HOT FLUIDS

Butler P. Crittenden, Watertown, and Alvin C. Killinger, Everett, Mass., assignors to Beacon Oil Company, Boston, Mass., a corporation of Massachusetts Application December 30, 1926, Serial No. 158,112

2 Claims. (Cl. 73—52)

This invention relates to the accurate measurement of the temperature of fluids, and particularly to devices by which the detector element of a thermometer or pyrometer may be protected from giving variably inaccurate indications differing from time to time in such difficult situations as when the instrument is relied upon to show the temperature of a stream of hot oil from a still or the like, or some other fluid, still or flowing, in a pipe or vessel.

In oil refineries and petroleum-treating plants particularly, the usual metallic thimble, well or casing for the heat detector is subject to deposits from the liquid or gaseous flow tending to alter the transmission rate of the wall of the well or thimble, and these deposits vitiate the relative accuracy of the indications of the detector.

This invention is particularly useful for maintaining the constancy of the transmission loss of the detector well, thimble or casing for a thermometer or pyrometer serving to indicate a flow temperature in a pipe or drum. The invention also provides for increasing the average accuracy, as an indication of the temperature of the whole, of that part of the fluid in contact with the thermometer well.

In the treatment of mineral oils for the production of gasoline and other products, for example, it is desirable accurately to determine the temperature of the liquid or gaseous hydrocarbons treated, particularly in cracking operations, for the reason that at certain temperatures the character of the products obtained changes markedly and rapidly. In processes in which a pyrometer is employed for determining the temperature, it is of frequent occurrence that a layer of carbon or coke forms and grows on the exterior surface of the pyrometer well or casing, this carbon layer acting as heat insulator, and preventing, because of its variable effect, any sufficiently accurate indication by transfer of heat of the temperature to be measured.

One of the objects of this invention is to provide means for preventing the deposition of foreign materal upon such a thermometer well or casing, and another object of the invention is to provide means for causing a local flow of a liquid when temperature is to be measured to and at the thermometer well, for the purpose of preventing the accumulation at the well of a body of liquid differing in temperature from the flow or body whose temperature is to be measured.

Another object of the invention is to provide a new and useful means for scraping or removing foreign material from a thermometer well or casing adapted to operate in a moving stream of a liquid under high pressures and temperatures.

With these and other objects in view, the invention will now be described in connection with certain forms only illustrated in the accompanying drawings, in which.

Figure 3:
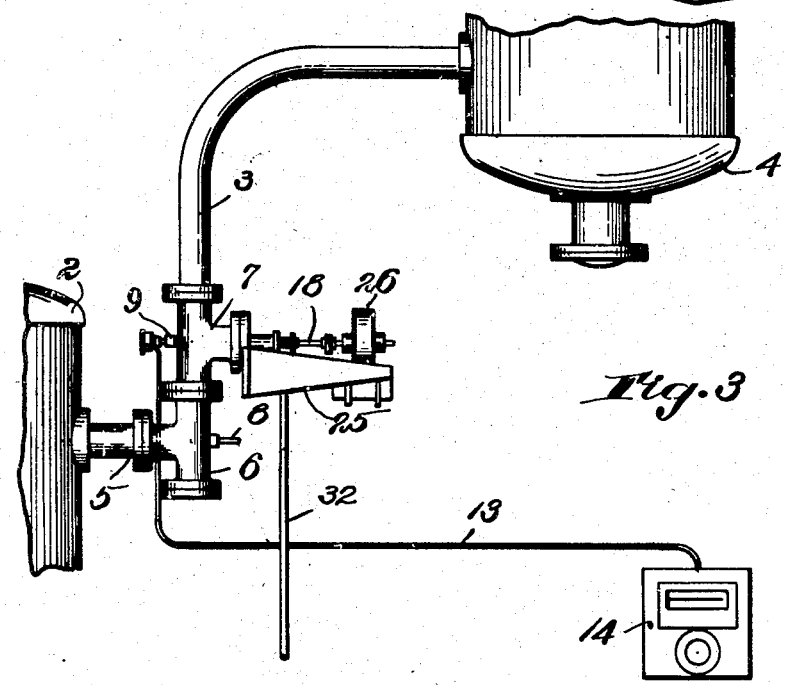
Fig. 3 is a view in elevation on a reduced scale illustrating the manner in which our invention may be employed in connection with the transfer from one apparatus to another of hot oil likely to deposit carbon or coke.

Referring now to Fig. 3, let it be supposed that the temperature of the flow from a still 2 from which oil is conducted through the pipe 3 to a soaking drum 4 is to be measured at exit from the still 2. Large and strong pipe connections comprising the flanged pipe 5 and suitable T-couplings 6 and 7 are usually employed in this connection. The pipe coupling 6 may be tapped for a thimble not shown in detail constituting a well for a usual type of thermometer 8, which may well be retained as furnishing a sufficient rough indication of the temperature. But for purposes of record or accuracy, we prefer to provide in the coupling 7, for example at 9, a thimble or well 10 best shown in Fig. 1, and comprising a strong relatively thin metal casing suitably bored for the detector element 12 of a distant-indicating thermometer or pyrometer, which as a whole may comprise an electric circut shown at 13 and an indicator or recording device shown at 14.

Figures 1, 4:
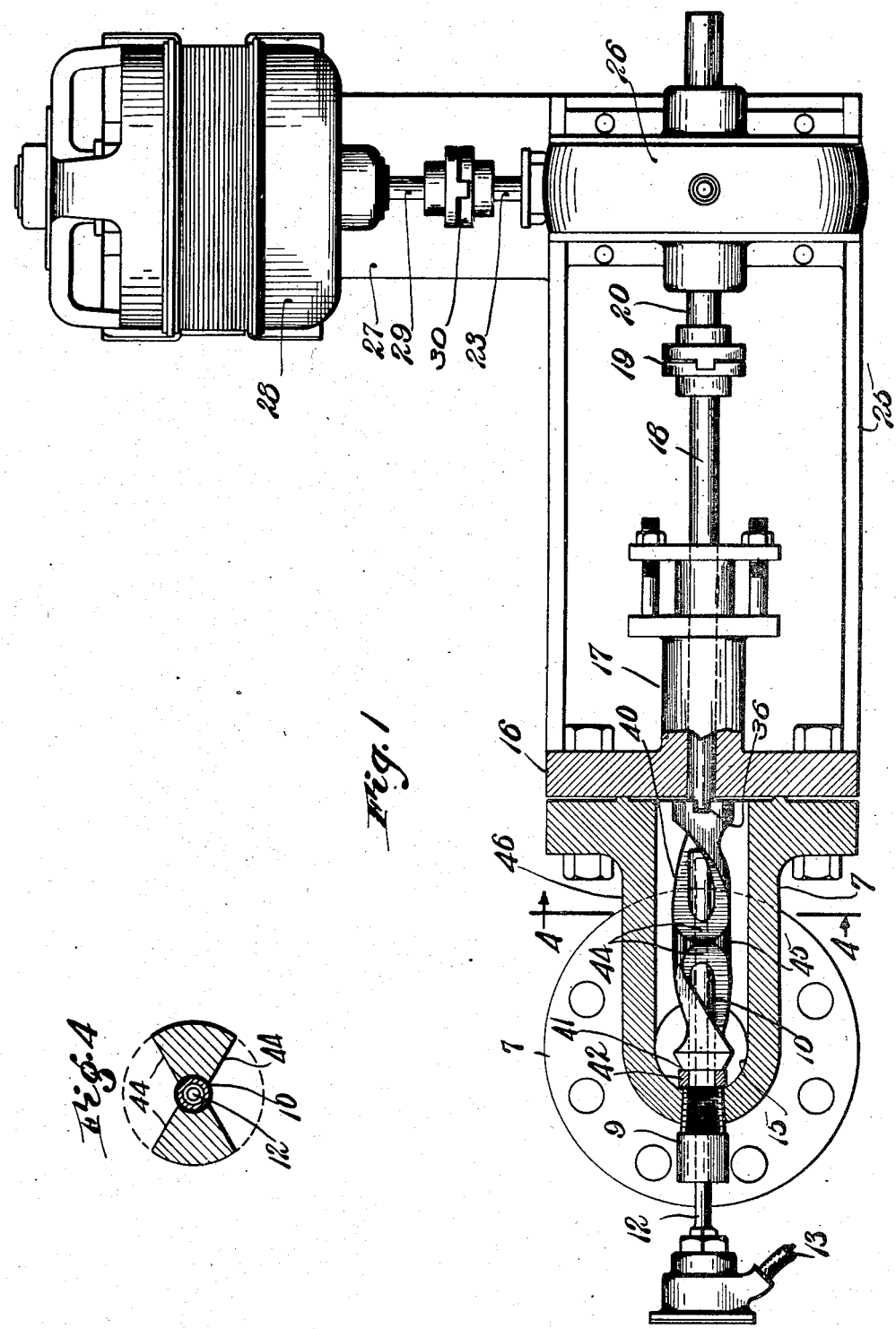
Fig. 1 is a detail plan view partly in section of apparatus exemplifying one application of the invention.
Fig. 4 is a detailed section on the line 4—4 of Fig. 1.
Figure 2:
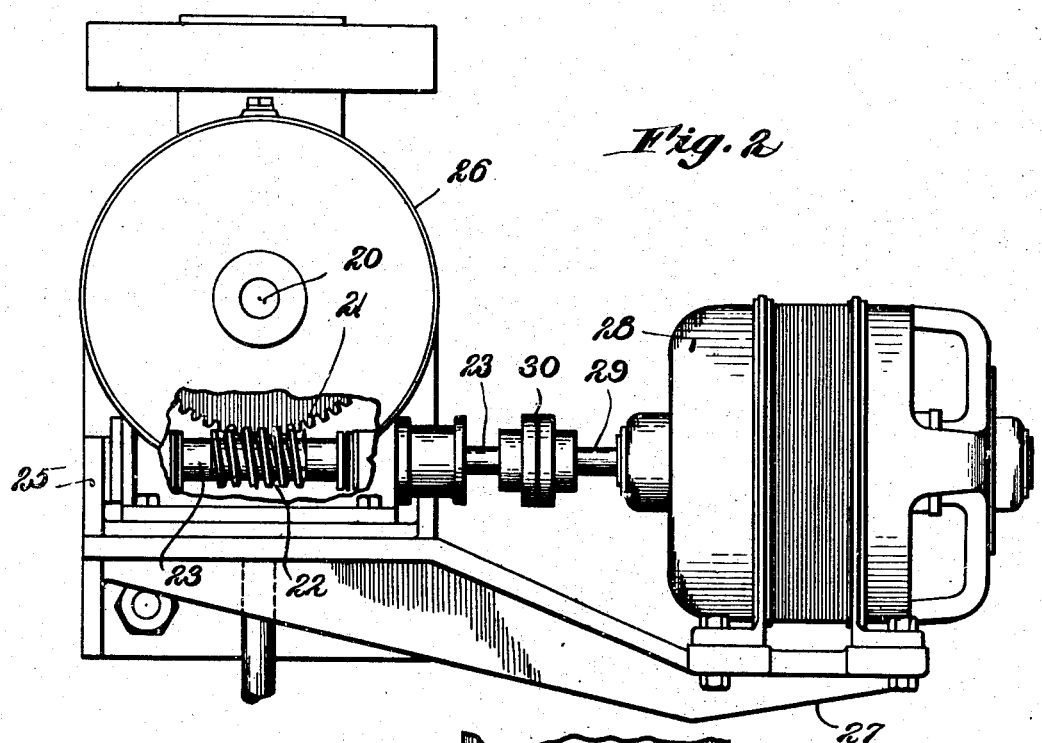
Fig. 2 is a view in elevation from the right in Fig. 1.

Referring now to Fig. 1, it will be observed that the well 10 stands across the bore 15 of the coupling 7 and may project for a considerable distance into the flanged T-passage 46 of this coupling, which passage is capped by a cover 16 having thereon a gland 17 suitably packed to receive a shaft 18 coupled at 19 to a gear shaft 20 upon which, Fig. 2, may be fixed a worm wheel 21 meshing with a worm 22 on a shaft 23 having suitable end bearings in a bracket 25, Figs. 1 and 2, which may be integral with or attached to the cover 16.

The bracket 25 is preferably provided with a suitable casing at 26 for the worm wheel 21 having thereon bearings for shaft 20, and which may have integral with or attached thereto an extension bracket 27 adapted to support a suitable enclosed type of electric motor 28 of which the armature shaft 29 is in line with and coupled at 30 to the shaft 23. The bracket 25, see Fig. 3, may be provided with suitable side and bottom webs to constitute a drain trough into which may be tapped a drain pipe 32 to receive drip from the gland 17, if any.

Within the head 16, Fig. 1, the shaft 18 may be provided with a suitable clutch member 36 engaging a cross slot in the head of a rotary scraper and stirrer member 40 having a longitudinal central bore adapted to fit over the well 10 with sufficient clearance, for example 5 to 50 thousandths of an inch. The member 40 may be faced off at one end at 41 to bear against an anti-friction ring 42 carried by the well 10.

The member 40 may be of any suitable form for the purpose, but as shown and preferred is a relatively thick steel tube having a central bore, Fig. 4, penetrated by V-shaped milled slots 44 into its central bore; preferably these slots ending short of a solid central portion 45, Fig. 1; the tube 40 being twisted to provide helically disposed scraping edges where the slots 44 intersect the central bore.

In operation the rotary element 40 is rotated by the motor 28 and the described gear connection, with the effect of continuously sweeping the exterior of the well 10, thus removing any deposit which may form on the well 10 and with the further effect of continuously stirring the fluid in the T-passage 46 and flowing in from the bore 15, so as to expose the whole length of the well 10 to fluid of the average temperature of the flow in the bore 15.

We claim:

1. In a temperature-measuring device for liquids held in containers under pressure, a tubular well for the detector element of a temperature measuring instrument in combination with a rotary element concentric with said well having a central bore therein and a helically disposed scraping edge along said bore, a shaft having a bearing in the wall of said container adapted to drive said rotary element, and means for rotating said shaft during the operation of said device.

2. For use in a temperature-measuring device, a thermometer well scraper and fluid stirrer comprising a tubular barrel having a central bore, said scraper and stirrer having a helically disposed slot intersecting its central bore.

BUTLER P. CRITTENDEN.
ALVIN C. KILLINGER.